United States Patent [19]

Fowler

[11] 4,031,630
[45] June 28, 1977

[54] CALIBRATION APPARATUS FOR AUTOMATIC MAGNETIC COMPASS CORRECTION

[75] Inventor: John T. Fowler, Winthrop, Mass.

[73] Assignee: The Laitram Corporation, Harahan, La.

[22] Filed: June 17, 1976

[21] Appl. No.: 697,195

[52] U.S. Cl. .............................................. 33/356
[51] Int. Cl.² ..................................... G01C 17/38
[58] Field of Search ............. 33/356, 357, 362, 326

[56] References Cited

UNITED STATES PATENTS

| | | | |
|---|---|---|---|
| 3,071,959 | 1/1963 | Depp | 33/357 |
| 3,311,821 | 3/1967 | Brunel | 33/357 |
| 3,634,946 | 1/1972 | Star | 33/356 |
| 3,746,842 | 7/1973 | Fowler | 33/363 K X |

Primary Examiner—Harry N. Haroian
Attorney, Agent, or Firm—Weingarten, Maxham & Schurgin

[57] ABSTRACT

Method and apparatus for providing calibration of automatic deviation-correction circuitry for a magnetic compass. Data representing deviation-corrections for respective compass headings are derived by comparing signals representative of the actual heading of the compass with the compass output signal at a plurality of headings to provide corresponding corrections which are stored in a memory to produce an output signal representing actual heading and corrected for deviation error.

9 Claims, 4 Drawing Figures

CALIBRATION APPARATUS FOR AUTOMATIC MAGNETIC COMPASS CORRECTION

FIELD OF THE INVENTION

This invention relates to remote reading magnetic compasses and more particularly to a system for automatic correction of deviation and other magnetic errors thereof.

BACKGROUND OF THE INVENTION

Magnetic compasses are subject to several outside influences which produce errors in the compass reading. One of these error sources is magnetic variation, which is the difference between the direction of the field lines of the earth's magnetic field and true north at any particular point in the world and which is a function of geographical position. Another source of error is magnetic deviation which is the difference between magnetic north and the actual compass reading caused by magnetic perturbations resulting from the vessel itself or equipment on the vessel. Deviation changes as a function of the heading of the vessel.

Variation is always given on navigation charts and may be compensated for by correcting the compass reading by a constant correction factor for a particular geographical area, and which factor changes relatively infrequently. Deviation-correction, however, is much more tedious since deviation is a function of vessel heading, and many different correction factors must be provided for the different headings. Deviation is commonly corrected by reference to a chart containing deviation-correction factors for different headings, of the particular vessel, such as for every 10 degrees. Since the heading may change frequently, correcting for deviation can become burdensome. Additionally, the calibration procedure by which a deviation chart is made is tedious and time consuming.

SUMMARY OF THE INVENTION

The present invention provides a system for automatic deviation-correction of a remote reading magnetic compass. This system is particularly adapted to use with compasses having digital signal outputs of the type exemplified by U.S. Pat. Nos. 3,888,016 and 3,833,901, assigned to the same assignee as the present invention.

Briefly, the invention includes circuitry coupled between the digital compass and the display or other output device for automatically adding or subtracting a deviation-correction factor to the compass output for corresponding headings. The correction circuitry includes a memory such as a read-only memory containing respective deviation-corrections for corresponding headings. Typically, correction can be provided in memory for each degree of a complete 360° heading sequence. The memory can store correction factors for associated headings or corrected headings themselves. In the case where correction factors are stored, the digital compass output for a given heading is applied to address the memory, and the resulting correction factor is combined with the compass output by processing logic to produce a corrected output for display or other use. If corrected headings are stored in memory, the compass output for a given heading causes provision by the memory of a corrected heading directly for display or use.

The memory is programmed typically by use of a gyrocompass, or other apparatus for producing a stable indication of heading independent of deviation effects. The heading information from the gyrocompass and the heading information from the digital compass are applied to processing logic which determines the proper correction which is applied to the memory. During the calibration operation, the vessel aboard which the digital compass is installed is steered in a circular course so that the deviation error of the magnetic compass may be computed for all headings. At predetermined intervals, the gyrocompass processing logic applies a Write or strobe signal to the memory, causing the computed deviation-correction to be stored in the memory.

DETAILED DESCRIPTION OF THE DRAWINGS

These and other advantages of the present invention will become more apparent upon reading the following detailed description of the invention in conjunction with the drawings herewith, of which:

DETAILED DESCRIPTION OF THE INVENTION

Figure 1:
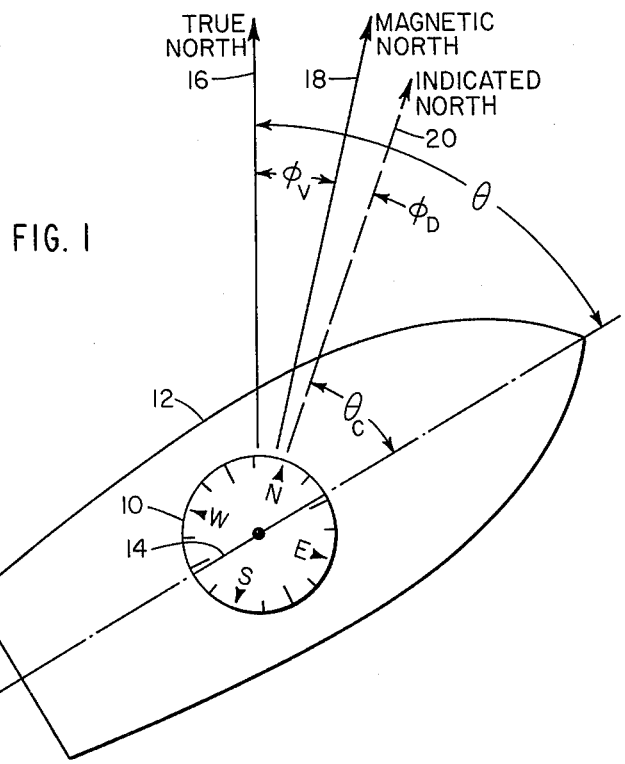
FIG. 1 is a schematic depiction of the different errors affecting a magnetic compass reading.

Referring to FIG. 1, there are shown in schematic form the different errors affecting a magnetic compass. A magnetic compass 10 located in a vessel 12 or other vehicle will tend to assume a specific orientation due to the well known north-seeking properties of magnetic compasses. The direction in which the boat is heading may then read from the compass by means of an indicator line 14, commonly termed a lubber's line. The compass reading denoted as $\theta_C$ corresponds with the heading of the vessel.

Ideally, the compass would align itself such that it points exactly towards true north, as indicated by arrow 16. However, due to various magnetic effects, the compass usually points in a direction different from true north.

First, the magnetic lines of force with which the compass aligns itself are generally such that magnetic north does not exactly coincide with true north, as shown by arrow 18. This difference between true north and magnetic north is called variation, and is denoted by the angle $\phi_V$. This value of variation changes slowly with geographical position.

The second main source of compass error arises from the interaction of the earth's magnetic field with the various magnetic materials of or located on board the vessel 12 which cause the compass to point in a direction different from magnetic north, as denoted by arrow 20. This error is called deviation and is denoted in FIG. 1 by the symbol $\phi_D$. Since the deviation is produced by magnetic structures on board the vessel 12, the magnitude of the deviation will vary as the heading of the vessel changes, causing the relationship of the earth's magnetic field and such magnetic structures to change. The actual angle between to boat's heading and true north, denoted as $\theta$, is determined by appropriately adding or subtracting the variation $\phi_V$ and the deviation $\phi_D$ from the actual compass reading $\theta_C$.

Figure 2:
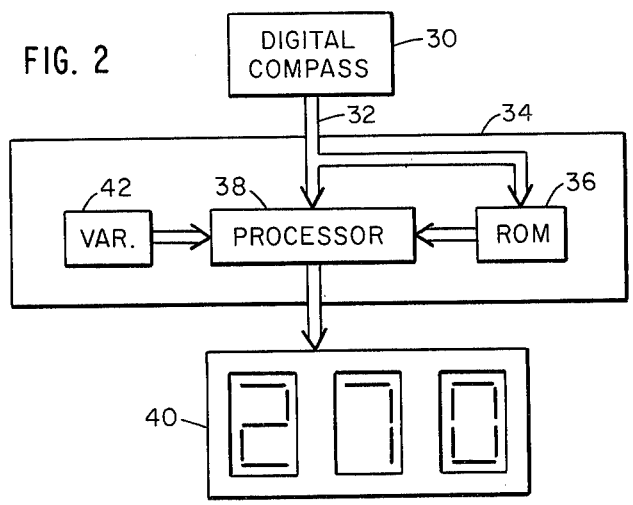
FIG. 2 is a block diagram of the invention.

Referring to FIG. 2, there is shown the circuitry of the invention for providing signals to compensate for deviation errors in the output of the digital compass. A digital compass 30 such as that described in the aforesaid patents, produces digital signals representative of the heading and which are transmitted along a cable 32 to the deviation-correction circuitry 34 of the invention. As the boat assumes different headings as it proceeds along it course, compass 30 will produce different digital outputs representative of these headings. These outputs are applied to the address input of a read-only memory (ROM) 36, and to an input of processor 38. In response to an input, ROM 36 provides at its output the data stored in the location therein corresponding with the particular heading output from compass 30. This data corresponds with the deviation-correction factors which have been previously stored in ROM 36, as explained in greater detail below. Processor 38 receives both the heading data from compass 30 and the deviation-correction data from ROM 36 and combines the data to produce a deviation-corrected output signal which may be applied to a readout 40 for display of the corrected compass heading, or to any other device for utilization of the directional information.

Processor 38 may also be supplied with signals representative of the local magnetic variation from a suitable source 42. Processor 38 combines the variation correction with the deviation-corrected output signal to compensate for errors from both magnetic variation and deviation. The digital output signals from processor 38 are thus representative of the corrected compass reading with respect to true north. The source 42 of the magnetic variation correction signals may be, for example, thumbwheel switches by which the value of the local magnetic variation is dialed in. It can be seen that the circuitry of FIG. 2 provides an inexpensive and simple means for automatically compensating for magnetic errors in the output of compass 30 to yield a compass heading indication which is corrected for deviation or deviation and variation without further need for manual correctional computations.

Figure 3:
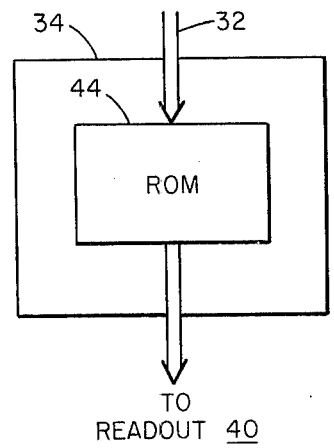
FIG. 3 is a block diagram of an alternative embodiment of the correction circuitry of the invention.

FIG. 3 shows an alternative embodiment of the correction circuitry 34 in which the digital data representative of the heading of compass 30 is applied directly to the address inputs of a read-only memory 44. Memory 44 directly produces the deviation-corrected heading information in response to the data from compass 30. The circuitry of FIG. 3 requires that ROM 44 be of larger capacity than that of ROM 36 in order to contain the entire directional data, rather than just the correctional data as in FIG. 2.

Figure 4:
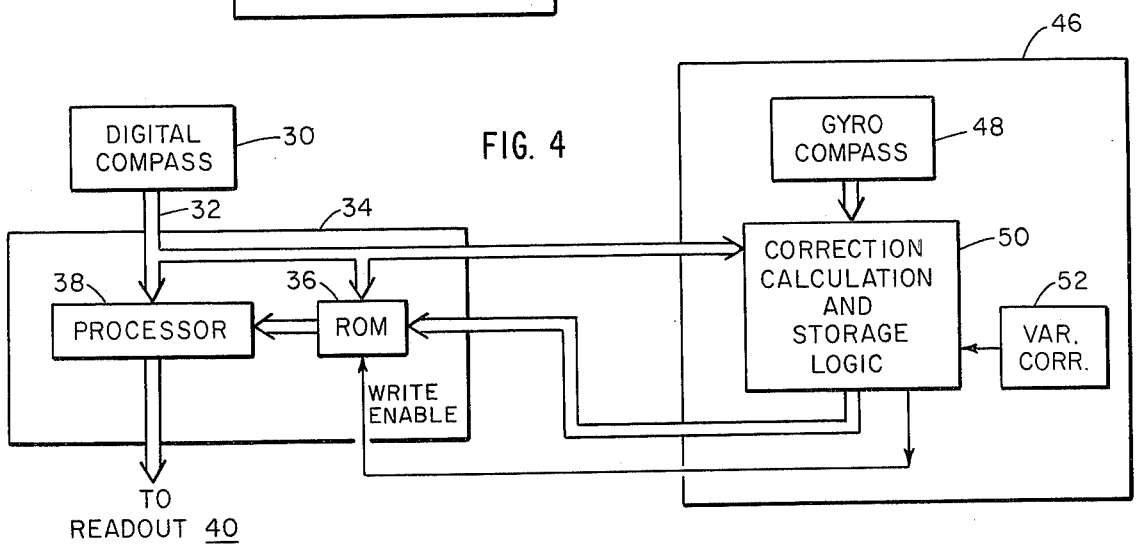
FIG. 4 is a block diagram of the apparatus by which the memory is programmed.

Referring to FIG. 4, there is shown the means by which the deviation-correction information is stored in ROM 36. Since deviation-corrections are different for each vessel, it is especially desirable to have a simple, quick and reliable system for determining the proper deviation-corrections and for storing such corrections in ROM 36. The calibration instrumentation 46 shown in FIG. 4 performs this function and is temporarily employed on board the vessel to achieve initial calibration of the correction circuitry. Typically, calibration instrumentation 46 contains a gyrocompass 48 or other instrument by which true directional information may be obtained independent of the magnetic deviation errors which affect compass 30. Directional information from gyrocompass 48 is applied to correction calculation and storage logic 50 which is interconnected with circuitry 34 such as by suitable connectors.

To initially store the proper correction values in ROM 36 of circuitry 34, calibration instrumentation 46 is temporarily connected to compensation circuitry 34 as illustrated. Next, the vessel is steered in a circular course which causes its heading to span the complete 360° of possible headings. As the heading of the vessel changes, the output of compass 30 indicating the vessel heading, but including magnetic deviation and variation errors, is compared with the true heading as determined by gyrocompass 48 is logic 50. From this comparison, logic 50 calculates the deviation-correction factor which is then applied to the inputs to ROM 36. At selected intervals, logic 50 produces a strobe signal which is applied to the Write enable input of ROM 36 and which causes the presently calculated deviation-correction factor to be stored therein. The frequency of strobe signals and the resulting number of individual deviation-correction factors stored in ROM 36 will depend upon the accuracy with which it is desired to correct compass 30. By use of the invention, correction can be readily provided for each 1° heading change.

If desired, variation correction circuitry 52 may be added to calibration instrumentation 46. This circuitry 52 applies signals to logic 50 for combination with deviation-correction signals to also compensate for effects due to local magnetic variation. It should also be appreciated that the calibration instrumentation 46 may easily be implemented to produce deviation-corrected heading data for entry into ROM 44 of the embodiment shown in FIG. 3.

The correction circuitry can be implemented in various forms well known to the art and various modifications to the present invention will become apparent to those of ordinary skill in the art of adapting these teachings to the requirements of various applications. Therefore, it is intended that the present invention be limited only as indicated in the appended claims.

What is claimed is:

1. Apparatus for providing a deviation-corrected output signal representative of an actual compass heading comprising:
   a magnetic compass providing an output signal representative of an indicated compass heading;
   means for storing deviation-correction signals representative of the deviation of the compass for each of a plurality of different indicated headings;
   means for retrieving the stored deviation-correction signal corresponding with the indicated compass heading in response to the output signal from the compass;
   means responsive to the retrieved deviation-correction signal and to the compass output signal for producing a deviation-corrected output signal representative of the actual compass heading; and
   a calibration circuit, including
      means for providing signals representative of the actual heading of the compass;
      means for providing the compass output signal to the calibration circuit;
      means responsive to the signals representative of the actual heading and to the compass output signal for providing signals representative of the difference therebetween; and
      means for causing the difference signals to be stored by the storing means.

2. The apparatus of claim 1 wherein the means for providing signals representative of the actual heading of the compass comprises a gyrocompass in a fixed angular relationship with the magnetic compass.

3. The apparatus of claim 2 wherein the calibration circuit is operative to cause the deviation-correction signals to be stored in the storing means as the magnetic compass and gyrocompass are rotated through 360°.

4. The apparatus of claim 2 wherein the calibration circuit further includes means for compensating for magnetic variation.

5. The apparatus of claim 1 wherein the storing means includes a read-only memory.

6. For use with a deviation-corrected magnetic compass of the type having a magnetic compass providing an output signal representative of an indicated compass heading and means for storing deviation-correction signals representative of the deviation of the compass for each of a plurality of different indicated headings and for producing a deviation-corrected signal corresponding with the indicated compass heading in response to the output signal from the compass;

a calibration circuit, comprising:
means for providing signals representative of the actual heading of the compass;
means for providing the compass output to the calibration circuit;
means responsive to the signals representative of the actual heading and to the compass output signal for providing deviation-correction signals representative of the deviation of the indicated compass heading; and
means for causing storage of the deviation-correction signals in the storing means.

7. The apparatus of claim 6 wherein the means for providing signals representative of the actual heading of the compass includes a gyrocompass.

8. A method for providing deviation-correction signals for a magnetic compass, comprising the steps of:
storing deviation-correction signals representative of the deviation of the compass for each of a plurality of different headings, by:
rotating the compass through 360° while the following steps are performed:
providing signals representative of the actual heading of the compass;
comparing the signals representative of the actual compass heading with the compass output signals to produce signals representative of the compass deviation; and
storing deviation-correction signals representative of the deviation of the compass for each of a plurality of different headings;
providing a digital compass output signal from a compass representative of an indicated compass heading; and
retrieving in response to the output signal from the compass the stored deviation-correction signal corresponding with the indicated compass heading to produce a deviation-corrected output signal representative of the actual compass heading.

9. The method of claim 7 wherein the step of comparing includes the step of computing the difference between the signals representative of the actual compass heading and the compass output signal to produce signals representative of the difference therebetween;
the difference signals being stored as the deviation-correction signals;
and further including the step of combining the compass output signal and the retrieved deviation-correction signal to produce a deviation-corrected output signal representative of the actual compass heading.

* * * * *